US006167800B1

(12) United States Patent
Su

(10) Patent No.: US 6,167,800 B1
(45) Date of Patent: Jan. 2, 2001

(54) OVEN

(76) Inventor: Yung Sen Su, PO Box 82-144, Taipei (TW)

(*) Notice: Under 35 U.S.C. 154(b), the term of this patent shall be extended for 0 days.

(21) Appl. No.: 09/526,506

(22) Filed: Mar. 16, 2000

(51) Int. Cl.[7] .............................. A47J 37/00; A47J 37/04; A47J 37/07

(52) U.S. Cl. ............................ 99/421 H; 99/419; 99/427; 99/446; 99/450; 99/482

(58) Field of Search ................ 99/339, 340, 419–421 V, 99/400, 401, 444–450, 426, 427, 481, 482; 126/25 R, 9 R, 41 R; 219/400, 401–404, 386

(56) References Cited

U.S. PATENT DOCUMENTS

| | | | | |
|---|---|---|---|---|
| 1,263,331 | * | 4/1918 | Lindroth | 99/446 |
| 2,618,730 | * | 11/1952 | Panken | 99/421 H |
| 2,696,163 | * | 12/1954 | Galley | 99/421 H |
| 2,762,293 | * | 9/1956 | Boyajian | 99/421 P |
| 2,885,950 | * | 5/1959 | Stoll et al. | 989/421 H |
| 3,104,605 | * | 9/1963 | McKinney | 99/421 H |
| 3,125,015 | * | 3/1964 | Schlaegel | 99/421 P |
| 3,196,776 | * | 7/1965 | Norton | 99/421 P |
| 3,205,812 | * | 9/1965 | Booth | 99/421 P |
| 3,296,957 | * | 1/1967 | Gagnon et al. | 99/444 |
| 3,333,529 | * | 8/1967 | Wilson | 99/421 P |
| 3,832,989 | * | 9/1974 | Belford | 126/25 R |
| 4,214,516 | * | 7/1980 | Friedl et al. | 99/447 |

* cited by examiner

*Primary Examiner*—Timothy F. Simone
(74) *Attorney, Agent, or Firm*—A & J

(57) ABSTRACT

An oven includes a housing, two supporting plates mounted at two opposite inner sides of the housing, each of the supporting plates having an upper edge formed with a first recess at an intermediate portion of the upper edge and a second recess close to an outer end of the upper edge, a roasting cage having two circular discs at two opposite sides thereof, each of the circular discs provided with an outwardly extending axle at a center thereof and a plurality of slots at a circumferential edge thereof, and a plurality of sticks each being fitted between two aligned slots, the axle being configured to be received in any one of the first and second recesses, a driven gear fixedly mounted on an axle of one of the circular discs, a motor mounted on one inner side of the housing and provided with an output shaft on which is mounted a driving gear meshed with the driven gear, a heater fixedly mounted on an inner side of the housing, and a lid openably engaged with the housing.

2 Claims, 7 Drawing Sheets

41
411
412
402
421
400
40
M
422
42
4
401

OVEN

BACKGROUND OF THE INVENTION

1. Field of the Invention

This invention is related to an oven and in particular to one having a roasting cage which can be taken out of the casing as required thereby facilitating the removal of the food on the roasting cage and preventing the user from being injured by the hot casing of the oven.

2. Description of the Prior Art

Referring to FIGS. 1 and 2 thereof, the conventional oven generally includes a casing 3, a stick 1 and a pair of forked members 2. The stick 1 is formed with a first recess 11 at one end and a second recess 12 at the other. The forked member 2 has a tubular body and a wing-like member 21 mounted on the tubular body. The tubular body of the forked member 2 is fitted over the stick 1 and fixedly mounted on the stick 1 by a screw 22 extending through the tubular body to bear against the stick 1. The stick 1 together with the forked members 2 is mounted within the casing 3, with its two ends engaged with two fixed seats 31 and 33. The fixed seat 33 is drivingly connected with a motor 30. The stick 1 cannot be taken out of the casing 3 after the oven is assembled. Hence, one will easily be injured by the hot casing 3 when taking out a hot roasted chicken from an oven. Furthermore, it is difficult to take out or mount a chicken on the stick within the casing 3 thereby often causing the forked member 2 from disengaging from the chicken 10 and dropping down the chicken 10 and therefore making the chicken directly contact the heater to cause a fire accident. In addition, it will be very inconvenient to clean the interior of the oven so that the food residue will allure cockroaches, ants, mice, . . . etc. to enter into the oven thereby often spreading diseases inadvertently.

Therefore, it is an object of the present invention to provide an improvement in the structure of an oven which can obviate and mitigate the above-mentioned drawbacks.

SUMMARY OF THE INVENTION

This invention is related to an improvement in the structure of an oven.

According to a preferred embodiment of the present invention, an oven includes a housing, two supporting plates mounted at two opposite inner sides of the housing, each of the supporting plates having an upper edge formed with a first recess at an intermediate portion of the upper edge and a second recess close to an outer end of the upper edge, a roasting cage having two circular discs at two opposite sides thereof, each of the circular discs provided with an outwardly extending axle at a center thereof and a plurality of slots at a circumferential edge thereof, and a plurality of sticks each being fitted between two aligned slots, the axle being configured to be received in any one of the first and second recesses, a driven gear fixedly mounted on an axle of one of the circular discs, a motor mounted on an inner side of the housing and provided with an output shaft on which is mounted a driving gear meshed with the driven gear, a heater fixedly mounted on an inner side of the housing, and a lid openably engaged with the housing.

It is the primary object of the present invention to provide an improved oven of which the roasting stick can be taken out of the casing as required thereby facilitating the removal of the food on the roasting stick and preventing the user from being injured by the hot casing.

It is another object of the present invention to provide an improved oven which can be easily cleaned and kept sanitary.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
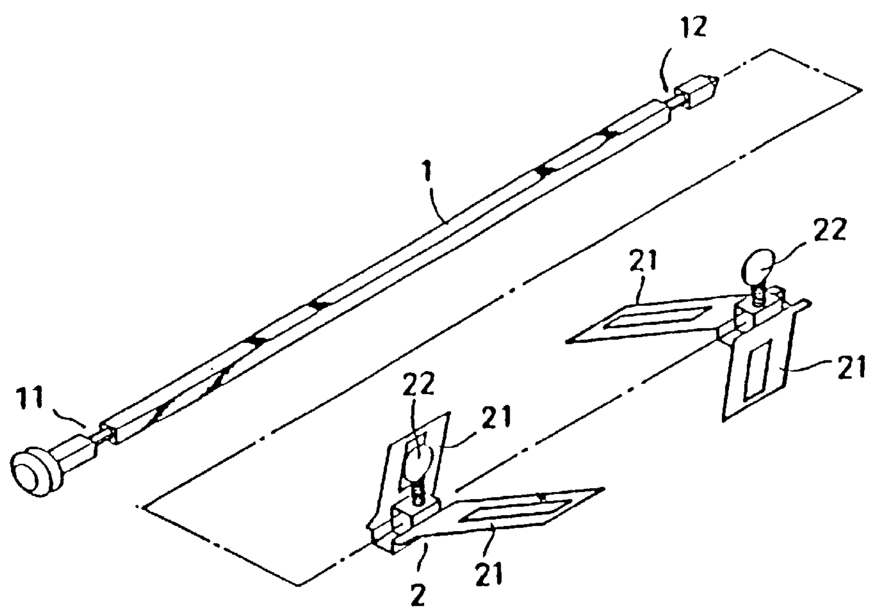
FIG. 1 is an exploded view of a conventional roasting stick.
Figure 2:
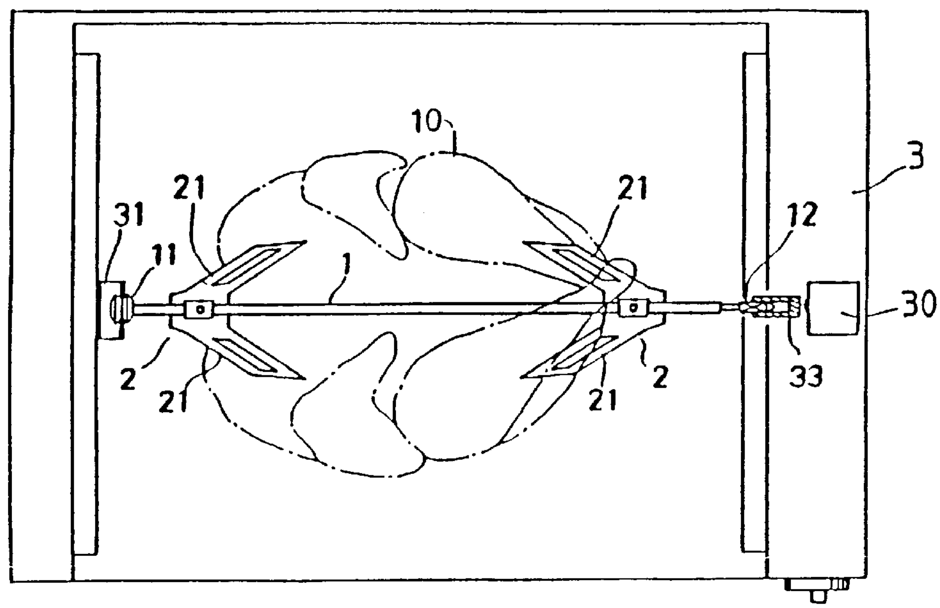
FIG. 2 is a sectional view of a conventional oven.
Figure 3:
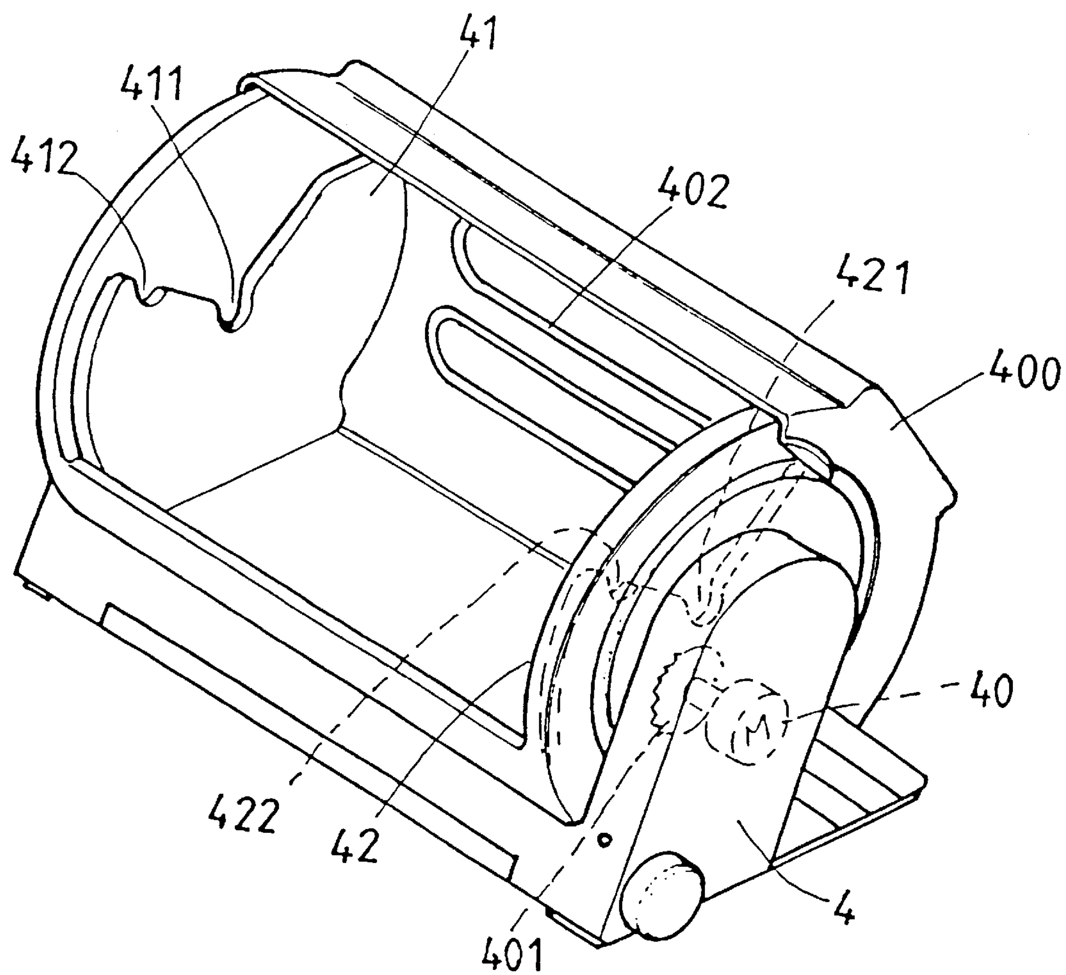
FIG. 3 is a perspective view of the present invention, without the roasting cage fitted therein.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

With reference to the drawings and in particular to FIGS. 3, 4, 5, 7 and 8 thereof, the oven according to the present invention generally comprises a housing 4, a lid 400, a heater 402, a motor 40, a roasting cage 5, and a driving gear 401. The lid 400 is slidably engaged with the housing 4. The heater 402 is arranged on the inner side of the housing 4. The housing 4 has two opposite lateral sides on which are mounted two supporting plates 41 and 42. The supporting plates 41 and 42 are formed with first recesses 411 and 421 at the intermediate portion of the upper edges thereof and second recesses 412 and 422 close to the outer ends of the upper edges.

Figure 4:
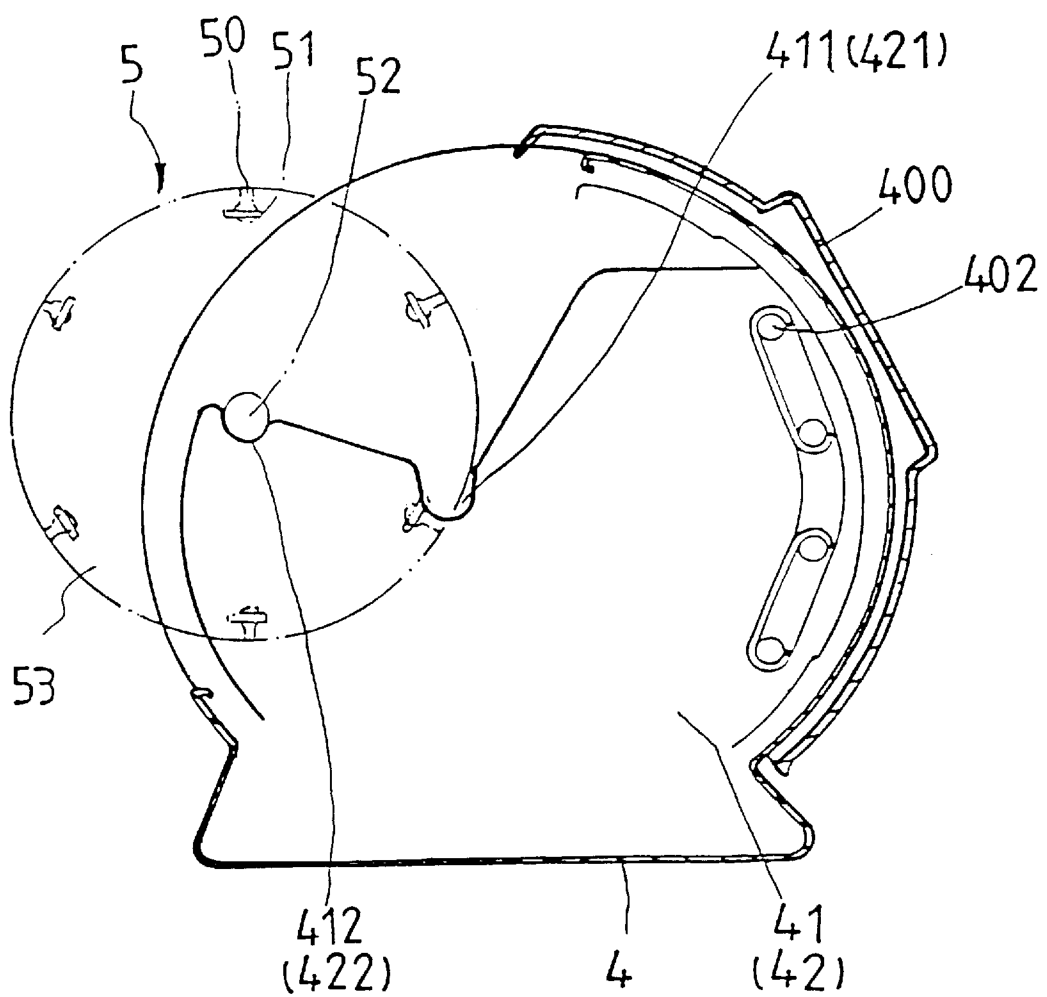
FIG. 4 is a side view of the present invention, with the roasting cage arranged at an outer position.
Figure 7:
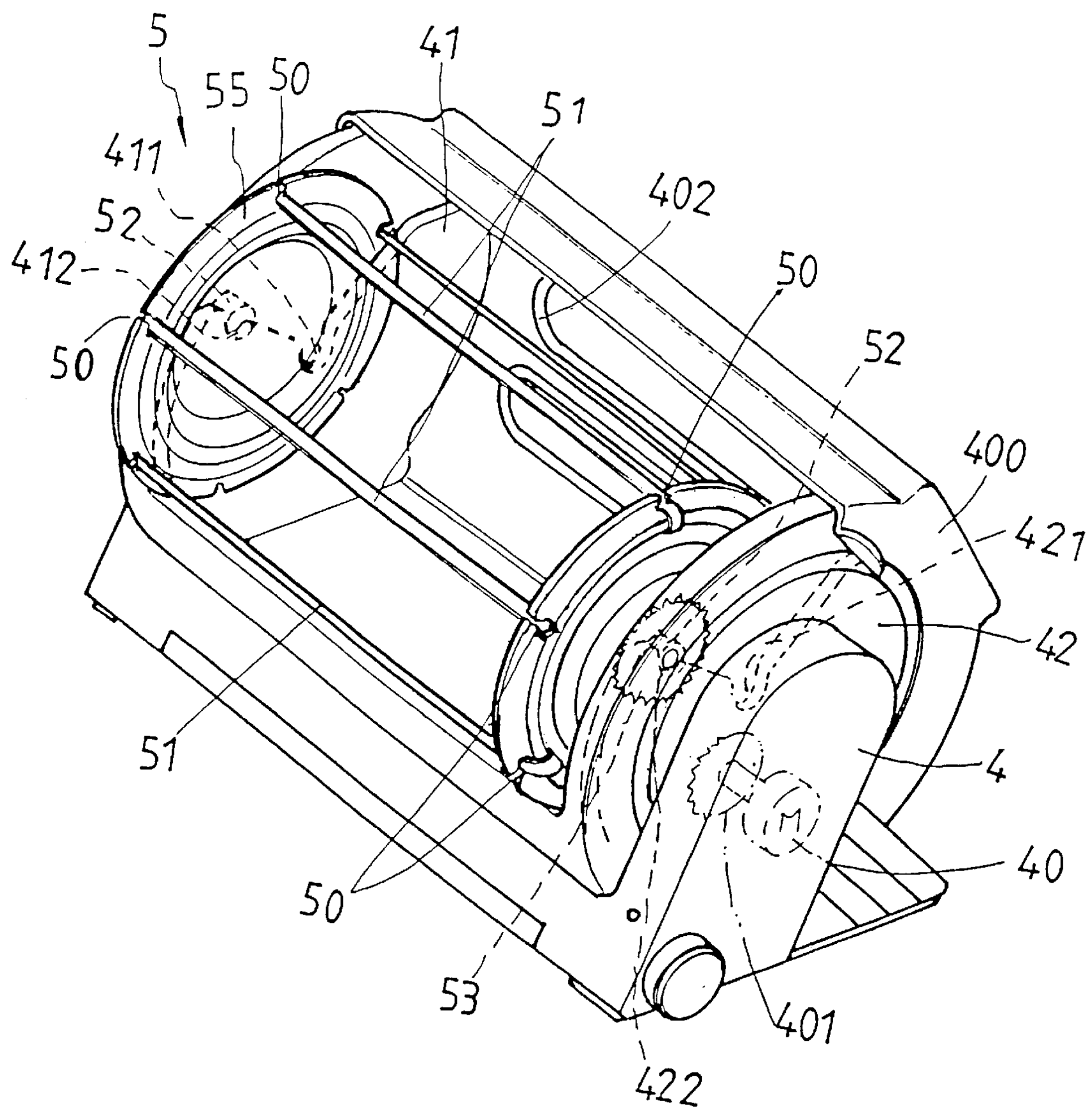
FIG. 7 is a perspective view of the present invention, with the roasting cage fitted therein.
Figure 8:
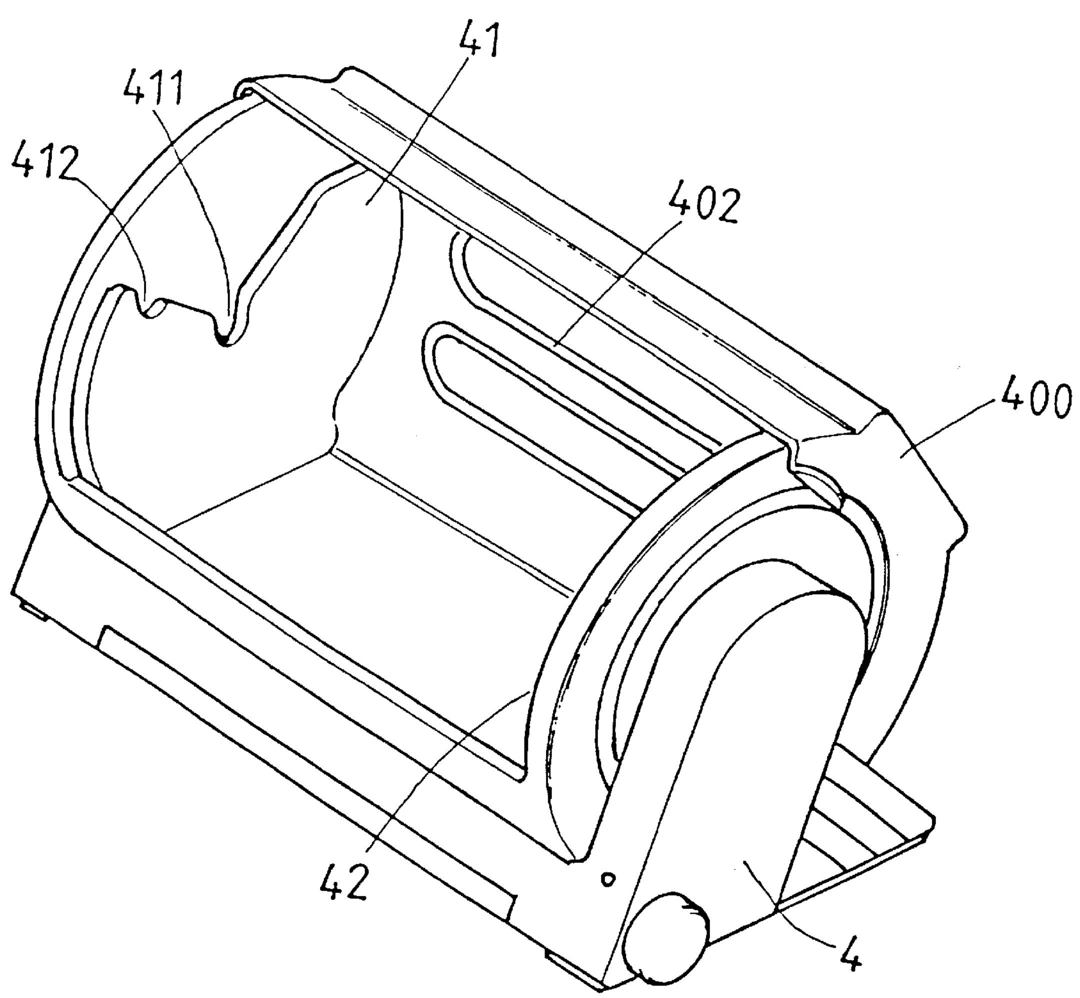
FIG. 8 is a perspective view of the present invention in an open condition.

Referring to FIGS. 4 and 7, the roasting cage 5 includes two circular discs 55 at two opposite ends thereof and a plurality of sticks 51 mounted on the circumferential edges of the circular discs 55. The circular disc 55 is provided with an outwardly extending axle 52 at the outer side thereof and a plurality of radial slots 50 at the circumferential edge thereof The axle 52 of the circular disc 55 is configured to be rotatably received in the first recesses 412 and 422 or second recesses 411 and 421, the of the housing 4, while the sticks 51 are dimensioned to be inserted into corresponding slots 50 of the circular discs 55. As the roasting cage 5 can be removed from the first recesses 412 and 422 from the second recesses 412 and 422, the food on the sticks 51 can be conveniently and safely removed therefrom by pulling out the sticks 51.

Figure 5:
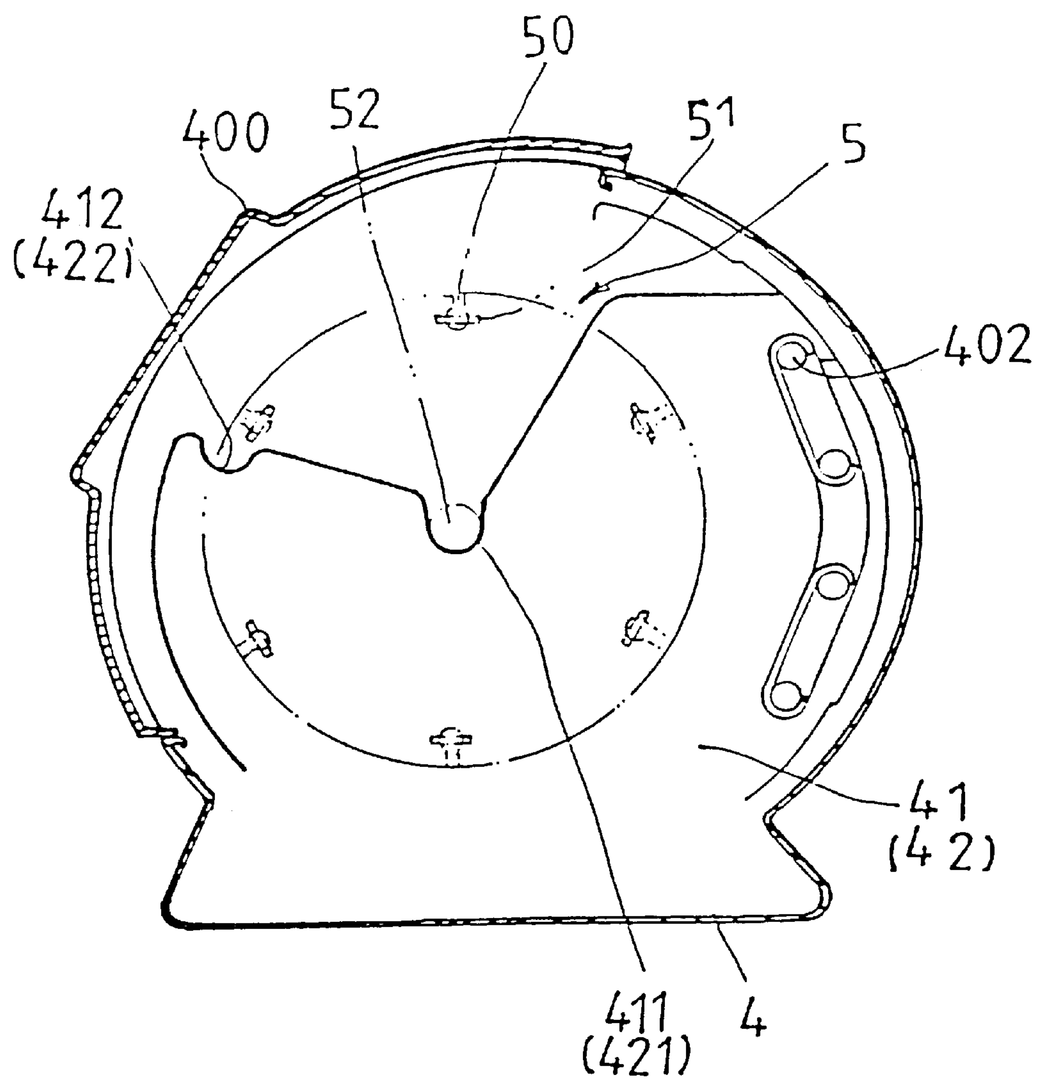
FIG. 5 is a side view of the present invention, with the roasting cage arranged at an inner position.
Figure 6:
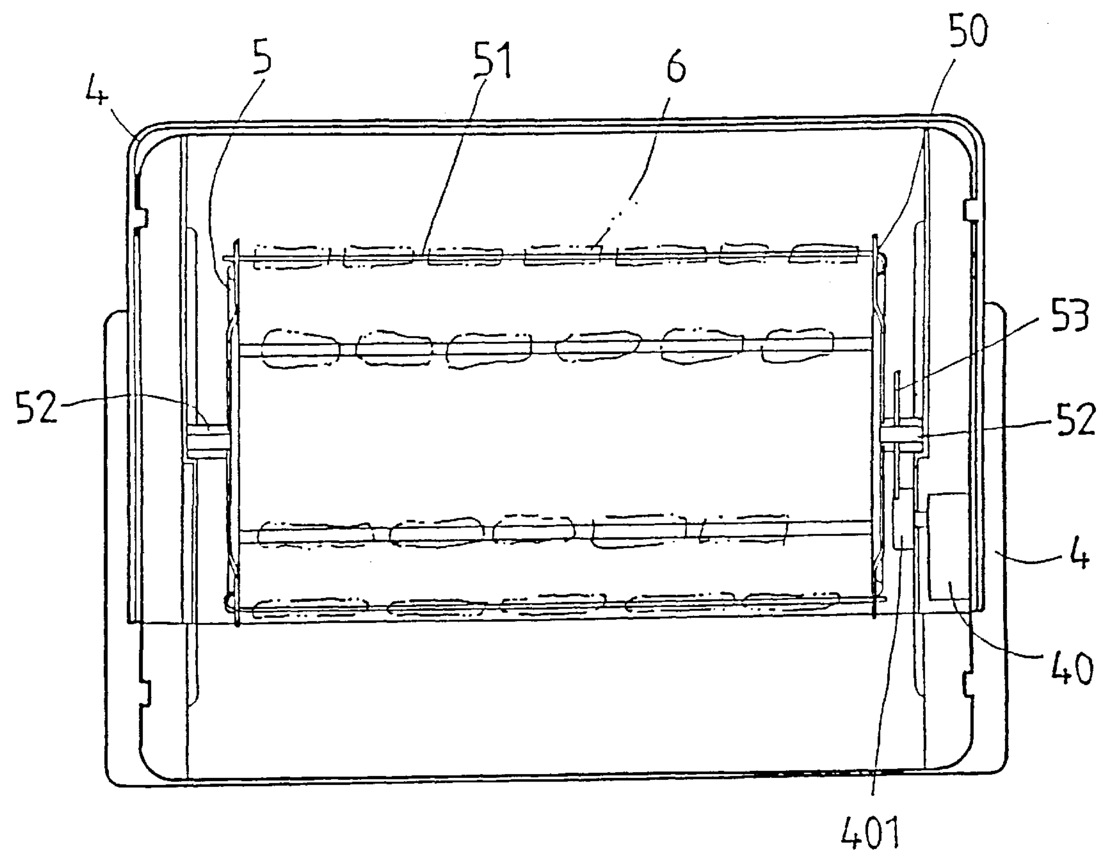
FIG. 6 is a cutaway view of the present invention.

Referring to FIGS. 5 and 6, a driven gear 53 is fixedly mounted on the axle 52 of the circular disc 55 at the right side (with respect to FIGS. 5 and 6). By means of the weight of the roasting cage 5, the driven gear 53 will engage with a driving gear 401 which is fixedly mounted an output axle of the motor 40. When in use, the roasting cage 5 is arranged on the first recesses 411 and 421 so that the roasting cage 5 will be rotated when the motor 40 is tuned on thereby evenly roasting the food thereon.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An oven comprising:

a housing;

two supporting plates mounted at two opposite inner sides of said housing, each of said supporting plates having an upper edge formed with a first recess at an intermediate portion of said upper edge and a second recess close to an outer end of said upper edge;

a roasting cage having two circular discs at two opposite sides thereof, each of said circular discs provided with an outwardly extending axle at a center thereof and a plurality of slots at a circumferential edge thereof, and a plurality of sticks each being fitted between two aligned slots, said axle being configured to be received in any one of said first and second recesses, a driven gear fixedly mounted on an axle of one of said circular discs;

a motor mounted on one inner side of said housing and provided with an output shaft on which is mounted a driving gear meshed with said driven gear;

a heater fixedly mounted on an inner side of said housing; and a lid openably engaged with said housing.

2. The oven as claimed in claim 1, wherein said upper edge is V-shaped.

* * * * *